United States Patent [19]

Takeno et al.

[11] Patent Number: 4,680,593

[45] Date of Patent: Jul. 14, 1987

[54] THERMAL PRINT HEAD

[75] Inventors: Shozo Takeno, Yokohama; Toshio Shimizu; Takashi Saito, both of Yokosuka, all of Japan

[73] Assignees: Kabushiki Kaisha Toshiba, Kawasaki; Nippon Telegraph & Telephone Corporation, Tokyo, both of Japan

[21] Appl. No.: 820,095

[22] Filed: Jan. 21, 1986

[30] Foreign Application Priority Data

Jan. 21, 1985 [JP] Japan .................................. 60-7459

[51] Int. Cl.[4] ........................ G01D 15/10; H05B 1/00

[52] U.S. Cl. ................................ 346/76 PH; 219/216

[58] Field of Search .................. 346/76 PH; 219/216, 219/543

[56] References Cited

U.S. PATENT DOCUMENTS 3,515,850 6/1970 Cady, Jr. ............................ 219/216

4,123,647 10/1978 Oda .................................... 219/216

FOREIGN PATENT DOCUMENTS 57-131576 8/1982 Japan .

*Primary Examiner*—E. A. Goldberg

*Assistant Examiner*—Gerald E. Preston

*Attorney, Agent, or Firm*—Cushman, Darby & Cushman

[57] ABSTRACT

This invention relates to a thermal head suitable for constituting a multithermal head used in a color printer, a method of manufacturing the same, and a multithermal head constituted by the thermal heads. The thermal head comprises a flexible insulating film having heating elements arranged in a predetermined pattern and lead wires which have one end electrically connected to the elements, the film being fixed on a substrate, and heating element driver ICs mounted on the substrate and electrically connected to the wires on the film. The method comprises the steps of, coating the film on the plate, forming the elements in a predetermined pattern and the wires on the film, dividing the plate into portions in accordance with a change in level of a surface of the substrate to which the film is to be fixed, fixing the divided portions of the plate on the substrate, and locating the ICs at a position lower than that of the elements on the substrate and connecting the other ends of the wires to the ICs. In the multithermal head, the thermal heads are fixed on a base so as to make lines of the elements of one thermal head parallel to the lines of that of the other thermal heads.

8 Claims, 8 Drawing Figures

THERMAL PRINT HEAD

BACKGROUND OF THE INVENTION

The present invention relates to a thermal head and a method of manufacturing the same and, more particularly, to a thermal head suitable for constituting a multithermal head used in a color printer, a method of manufacturing the same, and a multithermal head constituted by the thermal head.

As conventional image printing systems, an electrophotograpic system, an electrostatic system, a dry discharge system, an ink jet system, a thermal sensitive system, a thermal transfer system, and the like are well known. Efforts have been made not only to improve the quality of characters and figures formed by these systems, but also to decrease the running and manufacturing costs of them.

The conventional thermal sensitive system and thermal transfer system are compact and have a simple mechanical structure. In addition, these systems have a maintenance-free structure, do not make much noise and do not give off unpleasant smell. Therefore, they have been getting popular and have rapidly prevailed. In particular, the thermal transfer system allows color printing in principle. Various attempts have been made to enable the system to print color image. However, no feasible techniques for color printing have been developed.

In the conventional thermal transfer system, an ink film, which consists of a polymeric base film and solid ink coated on the base film and having thermal melting or sublimation properties, overlays recording normal paper. A thermal head is urged against the ink film. The head has a plurality of heating elements. These elements are selectively turned on/off in accordance with predetermined information while the ink film and the thermal head are moved relative to each other. The ink is transferred from the base film to the recording paper to print an image corresponding to the information. The following various techniques, which the thermal transfer system can employ to achieve color printing, are available:

(1) To use cyan, magenta, yellow and black ink films and four thermal heads corresponding to the four color films.

(2) To use one thermal head and a single ink film with the four colors sequentially coated on the base film along its longitudinal direction (the film has four-color lateral stripes regularly repeated on the base film along its longitudinal direction). Recording paper is reciprocated four times to record a single color image.

(3) To use four thermal heads and one ink film with four-color lateral stripes repeated on the base film along the longitudinal direction, and to move recording paper is only one direction.

Technique (1) has disadvantages in large size and high cost of a thermal transfer color printer. Although technique (2) is advantageous since a small printer suffices, color misregistration occurs and complex mechanisms is required since recording paper must be reciprocated four times. Technique (3) is promising over techniques (1) and (2), if the size of a multithermal head with four thermal heads is decreased.

In the conventional thermal head, the heating elements and an IC for driving these elements are mounted on the same surface region of a substrate. When four thermal heads of this type are arranged close to each other, thus providing a multithermal head, four groups of heating elements and four ICs must be provided in the same planar area. The planar area must inevitably be large. Furthermore, since each driver IC is higher than the heating elements, the recording paper cannot be fed parallel to the planar surface between the four groups of heating elements. A mechanism must be used which waves the recording paper between the four groups of heating elements to prevent the paper from colliding with the four driver ICs. Obviously, this mechanism is complex and very expensive.

Conventional thermal heads for solving the above problems are described in Japanese Utility Model Disclosure No. 57-193545 and Japanese Patent Disclosure Nos. 58-92576 and 57-93171. In these prior art thermal heads, a plurality of heating elements are arranged in a predetermined pattern on the upper surface of a base having a triangular or semi-circular cross section. A plurality of lead wires are connected at one ends to the heating elements. The other end of each lead wire extends on a side surface perpendicular to a tangent at a vertex of the top surface and is electrically connected to the heating element driver IC fixed on the side surface.

Even the above prior art thermal heads have the following defect. Since photoetching is adapted to form the heating elements and lead wires on the surface of the base, it is difficult to etch curved portions, shoulders or legs of the base if a portion of the base, on which the heating elements and lead wires to be formed, has a semi-circle, rectangle or trapezoid cross section. This is due to the following reason. When light is applied through a mask to a photoresist film, thereby performing contact or proximity exposure in normal photoetching, the resolution at such portion does not satisfy the requirements for a high density of the heating elements and lead wires since a distance between the mask and a photoresist film is variable at the curved portions, shoulders or legs. The thermal head described in Japanese Utility Model Disclosure No. 57-193545 has a columnar base, therefore, it is difficult to mount such a thermal head in a printer. In the thermal head described in Japanese Patent Disclosure No. 58-92576, since the lead wires, which have one ends electrically connected to a corresponding one of heating elements, have the other ends located on the inclined surface of the base having a triangular cross section, wire bonding between the other end of each lead wire and a heating element driver IC is difficult.

SUMMARY OF THE INVENTION

The present invention has been made in consideration of the above situation, and has as its first object to provide a compact thermal head which has a simple structure and can be easily manufactured.

It is a second object of the present invention to provide a method of most effectively manufacturing the thermal head in a desired form.

It is a third object of the present invention to provide a compact multithermal head using the abovementioned thermal head which helps to provide a color printer of a simple structure.

In order to achieve the first object of the present invention, there is provided a thermal head comprising: a substrate; a flexible insulating film having a plurality of heating elements arranged in a predetermined pattern and a plurality of lead wires each of which has one end electrically connected to a corresponding one of the plurality of heating elements; fixing means for fixing the flexible insulating film on the substrate; and a heating element driver integrated circuit mounted on the substrate and electrically connected to the other end of each of the plurality of lead wires on the flexible insulating film, the heating element driver integrated circuit being adapted to selectively heat the plurality of heating elements.

With the above structure, since the heating elements and lead wires can be formed by photoetching on the flexible insulating film before the flexible insulating film is fixed on the substrate, high density of photoetching can be performed independently of the shape of the surface of the substrate on which the flexible insulating film is to be fixed. Furthermore, since the heating elements and the lead wires are formed on the flexible insulating film, as described above, the lead wires can be easily electrically connected to the heating element driver integrated circuit irrespective of the arrangement of the heating element driver integrated circuit.

In the thermal head with the above structure, the heating element driver integrated circuit on the substrate is preferably located at a position lower than that of the heating elements on the substrate.

With this arrangement, when a plurality of thermal heads are combined to constitute a multithermal head used in a color printer, the heating element driver integrated circuit is located at the position lower than that of the heating elements on the substrate. This simplifies the construction of a paper feed mechanism in the color printer, and hence reduces the cost of the color printer.

In order to locate the heating element driver integrated circuit at a position lower than that of the plurality of heating elements provided on the substrate, a projection can be formed on the substrate, the plurality of heating elements can be located on the projecting end surface region of the projection on the substrate, and the heating element driver integrated circuit can be located at a position lower than the projecting end surface region of the projection on the substrate.

Alternatively, the plurality of heating elements and the heating element driver integrated circuit are respectively located on two surface regions of the substrate which intersect with each other.

In particular, in the latter case, the area of the surface region of the substrate, on which the plurality of heating elements are mounted, can be decreased. The groups of heating elements of the plurality of thermal heads can, therefore, be kept close to each other when the plurality of thermal heads are combined to constitute the multithermal head described above. At the same time, the area of the surface region, on which the groups of heating elements are mounted, can be decreased.

In the thermal head which can achieve the first object of the present invention, it is preferable that the fixing means has a thin metal plate fixed to the substrate, and the flexible insulating film is coated to the thin metal plate.

The thin metal plate not only reinforces the flexible insulating film but also improves the efficiency of heat dissipation.

When the surface of the substrate, on which the flexible insulating film is fixed, has a projection and/or a recess, the thin metal plate of the fixing means is preferably divided into a plurality of portions in accordance with a change in the level of the surface of the substrate on which the flexible insulating film is to be fixed, and is fixed on the surface of the substrate.

With this structure, the thin metal plate can be in tight contact with the surface of the substrate, and the thin metal plate can be easily fixed to the surface of the substrate, thus increasing mechanical strength of the fixing.

In order to achieve the second object of the present invention, there is provided a method of manufacturing a thermal head comprising the steps of: coating a flexible insulating film on a thin metal plate; forming a plurality of heating elements in a predetermined pattern and a plurality of lead wires on the flexible insulating film, each of the plurality of lead wire having one end electrically connected to a corresponding one of the plurality of heating elements; dividing the thin metal plate into a plurality of portions in accordance with a change in level of a surface level of the substrate to which the flexible insulating film is to be fixed; fixing portions of said thin metal plate on the surface of the substrate, so as to fix the flexible insulating film at a predetermined position on the surface of the substrate; and locating a heating element driver integrated circuit for selectively heating the plurality of heating elements at a position lower than that of the plurality of heating elements on the substrate and electrically connecting the other end of each of the plurality of lead wires on the flexible insulating film to the heating elements driver integrated circuit.

In order to achieve the third object of the present invention, there is provided a multithermal head comprising a plurality of thermal heads each having a substrate, a flexible insulating film having a plurality of heating elements arranged in a predetermined pattern and a plurality of lead wires each of which has one end electrically connected to a corresponding one of the plurality of heating elements, fixing means for fixing the flexible insulating film on the substrate, and a heating element driver integrated circuit mounted on the substrate and electrically connected to the other end of each of the plurality of lead wires on the flexible insulating film, the heating element driver integrated circuit being adapted to selectively heat the plurality of heating elements, wherein the plurality of thermal heads are fixed on a base so as to make lines or the heating elements of one thermal head parallel to tne lines of that of the other thermal heads.

In the multithermal head, various advantages derived from an application of the thermal head for achieving the first object are obtained.

DETAILED DESCRIPTION OF THE PREFERRED EMBODIMENTS

Figure 1:
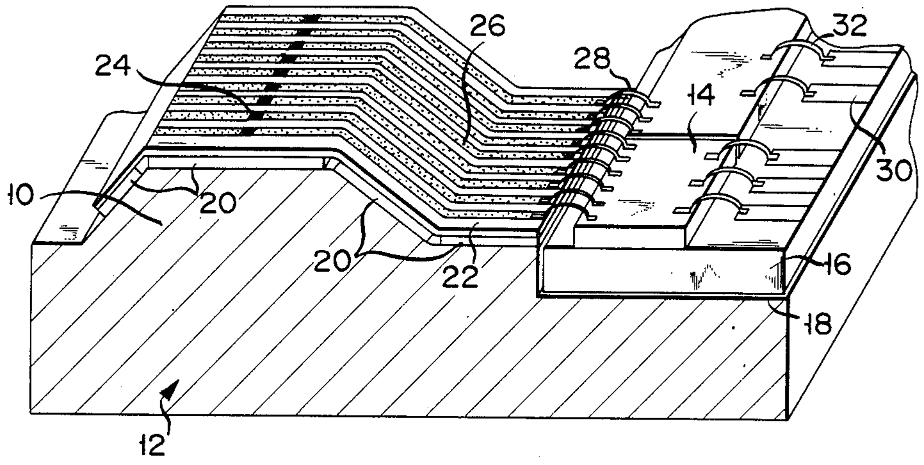
FIG. 1 is a perspective view of a thermal head according to a first embodiment of the present invention.

A thermal head according to a first embodiment of this invention has substrate 12, as showed in FIG. 1. Projection 10 with a substantially trapezoidal cross section is formed on the upper surface of substrate 12. Recess 18 is also formed in the upper surface of substrate 12, and driver board (e.g., a glass epoxy laminated board) 16 is fixed by a known fixing means such as an adhesive in recess 18. Heating element driver ICs 14 for selectively heating a plurality of heating elements (to be described later) in response to predetermined input signals are fixed on board 16.

Thin metal plate 20 is fixed on projection 10 by a known fixing means such as an adhesive. Plate 20 is divided into a plurality of portions in accordance with the shape of a flat upper or projecting end surface region of projection 10, two inclined surface regions located at both sides of the flat projecting end surface, and an upper surface region located between projection 10 and recess 18, that is a change in level of the upper surface of substrate 12. Flexible insulating film 22 is coated on the upper surface of thin metal plate 20. A plurality of known heating elements 24 are formed by a well known method (to be described later) in a predetermined pattern on the portion of the upper surface of film 22 which corresponds to the flat projecting end surface region of projection 10. A plurality of lead wires 26 are also formed in the same manner as the heating elements 24 formed on the upper surface of film 22, so as to one end electrically connect each wire 26 to a corresponding one of heating elements 24. The other end of each wire 26 extends near heating element driver ICs 14 over the upper surface of film 22 and is electrically connected to a corresponding terminal of ICs 14 by bonding wire 28. ICs 14 are also electrically connected oy bonding wires 32 to a plurality of lead wires 30 formed on the upper surface of board 16.

Wires 28 and 32 and ICs 14 are protected from an external force and activated atoms by a polymeric potting material (not shown) covering them.

ICs 14 are mounted in recess 18 located lower than the flat projecting end surface with heating elements 24 of projection 10 on substrate 12, potting material (not shown) for protecting ICs 14 is also located lower than the flat projecting end surface of projection 10 on substrate 12.

A method of manufacturing the thermal head having the above construction will be described hereinafter.

Figure 2:
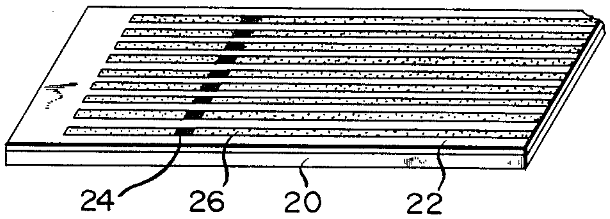
FIGS. 2 to 4 are perspective views for explaining the steps in manufacturing the thermal head in FIG. 1.

As shown in FIG. 2, flexible insulating film 22 or heat-resistive polymeric material is coated to plate 20. A material of plate 20 is selected in consideration of a coefficient of thermal expansion, a thermal conductivity, hardness and compatibility with an etching solution. As a result, Al and Cu are not selected, but Fe, Ni and their alloys are selected In this embodiment, an Fe plate of about 0.1 mm thickness is used. Film 22 is coated in the following manner. A polyamic-acid solution of varnish condition is coated on the upper surface of Fe plate 20, and then plate 20 with a polyamide film is heated in an $N_2$ gas atmosphere at a temperature of 400° C. for an hour. The polyamide film is thus thermally cured to obtain polyimide film 22 of about 20 μm thickness coated to plate 20.

Heating elements 24 are formed on film 22 in a predetermined pattern, as shown in FIG. 2 and lead wires 26 are also formed such that one ends thereof are electrically connected to corresponding heating elements 24. In this embodiment, a material Ta-$SiO_2$ for resistor film, or heating element, is sputtered to form the resistor film, or heating element, at a predetermined location of film 22, and then a material for lead wire such as Al is deposited in vacuum to form lead wires 26 on the surface of film 22. Photoetching is finally performed to obtain heating elements 24 in the predetermined pattern and lead wires 26 each of which has one end electrically connected to corresponding heat element 24. In this embodiment, an antiwearing protective film is laminated to cover heating elements 24 and lead wires 26 and metallization is performed for the other end of each lead wire 26.

Figure 3:
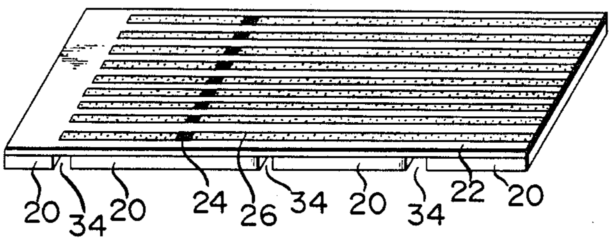

After heating elements 24 and lead wires 26 are formed on flexible insulating film 22, plate 20 is divided into some portions in accordance with a change in level of the surface (i.e., a projection or a recess on surface) of substrate 12 to which film 22 is fixed, as shown in FIG. 3. In this embodiment, plate 20 is divided by photoetching into some portions according to shapes of the flat upper or projecting end surface region of projection 10 on substrate 12, the inclined surface regions located at both sides of the flat projecting end surface region, and the upper surface region located between projection 10 and recess 18, as described in association with FIG. 1. In this embodiment wherein Fe plate of about 0.1-mm thick is used as plate 20, a width of slit 34 formed by photoetching is about 5 to about 0.5 mm.

Figure 4:
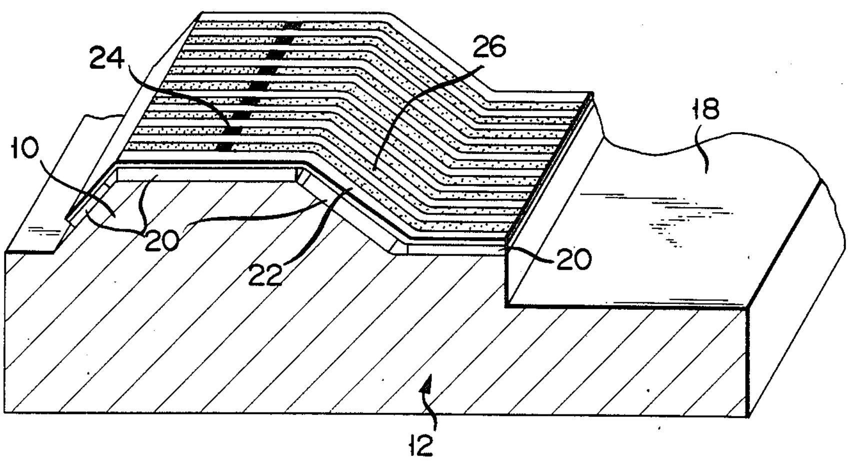

After plate 20 is divided into some portions as described above, film 22 on plate 20 is bent at slits 34, and the divided portions of plate 20 with a predetermined surface shape are adhered on the predetermined regions of substrate 12 by an adhesive, as shown in FIG. 4. Before divided portions of plate 20 are fixed to the predetermined regions of the upper surface of substrate 12, heating elements 24 are prevented by plate 20 from damage caused by the bending of film 22.

Subsequently, board 16 on which ICs 14 has been fixed and wires 30 has been formed is fixed by an adhesive in recess 18 in substrate 12, as shown in FIG. 1. The other end of each lead wire 26 on film 22 and lead wires 30 on board 16 are electrically connected to corresponding terminals of ICs 14 through wires 28 and 32. Finally, a polymeric potting material is dripped on ICs 14, and wires 28 and 32 to protect them from an external force and activated atom.

Figure 5:
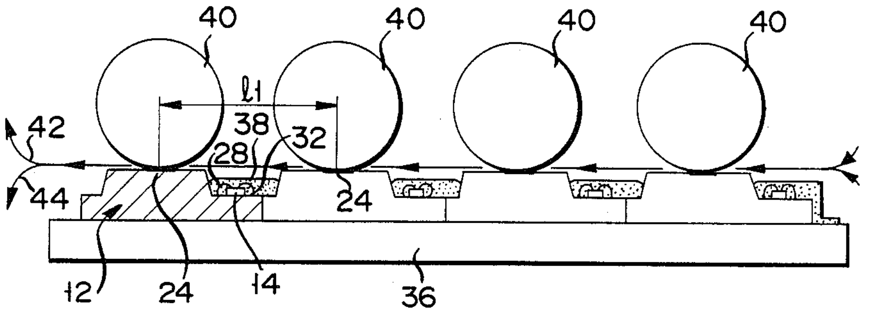
FIG. 5 is a schematical front view of a multithermal head constituted by a combination of thermal heads in FIG. 1 and built into a color printer.

A multithermal head constituted by combining a plurality of thermal heads formed by the above method will be described with reference to FIG. 5.

The four thermal heads shown in FIG. 1 are fixed on the upper surface of base 36 at equal intervals so as to make lines of the heating elements 24 of one thermal head parallel to the lines of that of the other thermal heads. The polymeric potting material 38 dripped on IC 14 and wires 28 and 32 is illustrated in FIG. 5.

Figure 6:
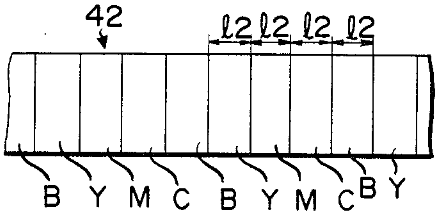
FIG. 6 is a partial plan view of a color ink film used in a color printer with the multithermal head of FIG. 5.

Four platens 40 are located near multithermal head mounted in a color printer in correspondence with four groups of heating elements 24 of four thermal heads. For the color printer incorporating the multithermal head described above, color ink film (i.e., a color ink ribbon) 42 is used. Film 42 has lateral stripes of four colors, i.e., four lateral stripes of yellow, magenta, cyan and black regularly repeated along the longitudinal direction of film 42, as shown in FIG. 6. A length of each lateral stripe in film 42 is given as 12 showed by below relation:

$n=(l1)/l1-l2)$ where l1 is the distance between adjacent two groups of heating elements 24, and n is the number of repeating times color ink can be used.

When color printing is performed in the above color printer, recording paper 44 and film 42 overlaid on paper 44 are pinched by four groups of heating elements 24 of four thermal heads and four platens 40. Paper 44 is fed at a speed of V mm/sec. while film 42 is fed in the same direction as that of paper 44 at a speed of V/n mm/sec.

A thermal head according to a second embodiment of the present invention will be described with reference to FIG. 7. The same reference numerals in the second embodiment denote the same parts as in the first embodiment, and a detailed description thereof will be omitted.

Figure 7:
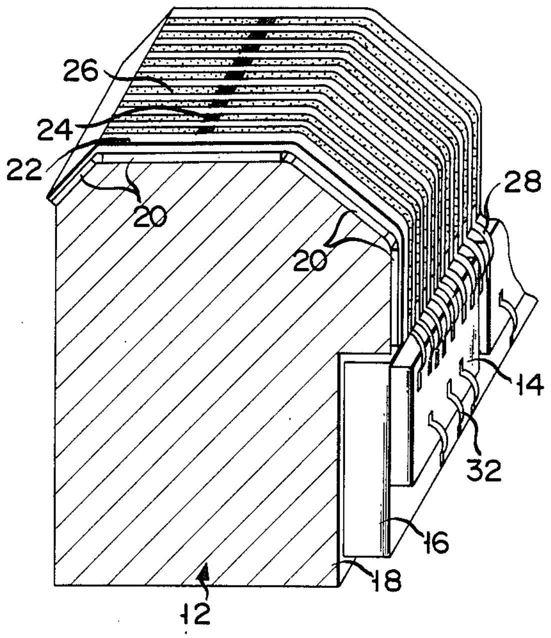
FIG. 7 is a perspective view of a thermal head according to a second embodiment of the present invention.

In the thermal head according to the second embodiment of the present invention showed in FIG. 7, recess 18 in which driver board 16 is fixed is formed in a side surface substantially perpendicular to the flat top surface of substrate 12 in which heating elements 24 are mounted.

A method of manufacturing the thermal head according to the second embodiment is the same as that of the first embodiment.

Figure 8:
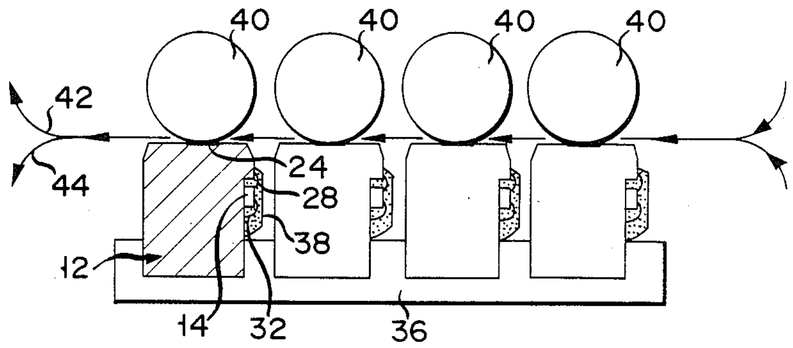
FIG. 8 is a schematical front view of a multithermal head constituted by a combination of thermal heads in FIG. 7 and built into a color printer.

FIG. 8 shows a multithermal head prepared by combining a plurality of thermal heads of the second embodiment. As is apparent from FIG. 8, the interval between groups of heating elements 24 can be decreased as compared with that of the multithermal head using the thermal heads of the first embodiment in FIG. 5. Therefore, the overall length of the multithermal head can be shortened.

The advantages of the present invention as described above are as follows:

(1) The multithermal head using the thermal heads of the present invention can be made compact as compared with one using the conventional thermal heads. As a result, the color printer as a whole is made compact.

(2) Since the heating element driver ICs are located at a position lower than the heating elements on the substrate in the thermal head according to the present invention, the feeding path of the recording paper and the color ink film or ribbon can be tangential to the surface region of substrate in which the heating elements are located. That is, the recording paper and the color ink film can be linearly fed over the multithermal head.

The feeding means for feeding the recording paper and the color ink film can be simplified, and hence the color printer can be also simplified.

(3) Precision of color registration in color printing can be improved for the same reason as in item (2).

(4) The thermal head can be manufactured by a known photoetching technique, and no new expensive manufacturing equipment is required.

The above embodiments exemplify the present invention but do not limit the present invention. Various changes and modifications can be made within the spirit and scope of the invention.

What is claimed is:

1. A thermal head comprising:

a substrate having a projection;

a rigid thin plate secured to the substrate and divided into a plurality of sections in accordance with a change in the level of the surface of the substrate;

a flexible insulating film coated over the upper surface of the rigid thin plate;

a plurality of heating elements provided on the flexible insulating film so that the heating elements correspond in location to the projection of the substrate, the heating elements being arranged in a predetermined pattern;

a plurality of lead wires provided on the flexible insulating film, one end of each of the lead wires being electrically connected to the heating elements; and an integrated circuit for driving the heating elements, the integrated circuit being located in a lower position on the substrate than the heating elements and being electrically connected to the other ends of the lead wires to selectively drive the heating elements.

2. A thermal head according to claim 1, wherein the heating elements correspond in location to the projected end surface of said projection of said substrate.

3. A thermal head according to claim 1, wherein surface regions on which the projection and integrated circuit are located intersect with each other.

4. A thermal head according to claim 1, wherein the rigid thin plate includes a thin metal plate.

5. A multithermal head including a plurality of thermal heads, each of the thermal heads comprising:

a substrate having a projection;

a rigid thin plate secured to the substrate and divided into a plurality of sections in accordance with a change in level of the surface of the substrate;

a flexible insulating film coated over the upper surface of the rigid thin plate;

a plurality of heating elements provided on the flexible insulating film such that the heating elements correspond in location to the projection of the substrate, the heating elements being arranged in a predetermined pattern;

a plurality of lead wires provided on the flexible insulating film, one end of each of the lead wires being electrically connected to the heating elements;

an integrated circuit for driving the heating elements, the integrated circuit being located in a lower position on the substrate than the heating elements and being electrically connected to the other ends of of the lead wires to selectively drive the heating elements; and wherein said plurality of thermal heads are fixed on a base so that lines of the heating elements of all the thermal heads are linearly arranged.

6. A multithermal head according to claim 5, wherein, in each of the thermal heads, the heating elements correspond in location to the projected end surface of said projection of said substrate.

7. A multithermal head according to claim 5, wherein, in each of the thermal heads, surface regions on which the projection and integrated circuit are located intersect with each other.

8. A multithermal head according to claim 5, wherein, in each of the thermal heads, the rigid thin plate includes a thin metal plate.

* * * * *